United States Patent [19]
Cochran

[11] Patent Number: 5,355,783
[45] Date of Patent: Oct. 18, 1994

[54] APPARATUS FOR SEPARATING CHAFF AND ROASTING COFFEE AND COCOA BEANS

[76] Inventor: David M. Cochran, 851 Tulare St., Pismo Beach, Calif. 93449

[21] Appl. No.: 144,716

[22] Filed: Oct. 27, 1993

[51] Int. Cl.5 ............................................. A23N 12/12
[52] U.S. Cl. ..................................... 99/483; 99/323.5; 99/469; 99/474; 34/371; 34/591; 95/59; 96/17; 209/127.2; 209/37
[58] Field of Search .................. 99/286, 323.5, 323.11, 99/469, 474, 476, 483, 601; 34/359, 360, 371, 376, 586, 591; 55/DIG. 34; 95/59, 61; 96/17; 209/21, 30, 36, 37, 127.1, 127.2, 129

[56] References Cited

U.S. PATENT DOCUMENTS

| | | | |
|---|---|---|---|
| 2,172,603 | 9/1939 | Adams et al. | 99/469 |
| 4,325,191 | 9/1982 | Kumagai et al. | 99/286 |
| 4,484,064 | 11/1984 | Murray | 99/474 |
| 4,698,916 | 10/1986 | Färber | 34/586 |
| 5,269,072 | 12/1993 | Waligorski | 99/286 |

FOREIGN PATENT DOCUMENTS

| | | | |
|---|---|---|---|
| 213645 | 3/1987 | European Pat. Off. | 99/286 |
| 3437432 | 9/1986 | Fed. Rep. of Germany | 99/286 |
| 86493 | 11/1955 | Norway | 209/127.1 |
| 2151124 | 7/1985 | United Kingdom | 99/474 |

*Primary Examiner*—Mark Spisich
*Attorney, Agent, or Firm*—McCubbrey, Bartels & Ward

[57] ABSTRACT

A method and apparatus for separating chaff from coffee and cocoa beans is designed for use in combination with the hot air blowing base of the common household consumer appliance, the electrical popcorn popper. The method comprises a hopper having an open top, an open bottom mountable over the hot air blowing base of the popper for roasting beans and an exhaust gas outlet, a lid for covering the top and a screen mounted over the exhaust gas outlet. The screen is coated with a material that causes its surface to become electrostatically charged during the bean roasting process. The chaff from the beans becomes separated during the roasting process and then is entrained in the exhaust gases which pass upward from the hot air blowing base for roasting the beans and through the open bottom. The chaff is collected on the electrostatically charged screen and is easily removed after the roasting process.

27 Claims, 2 Drawing Sheets

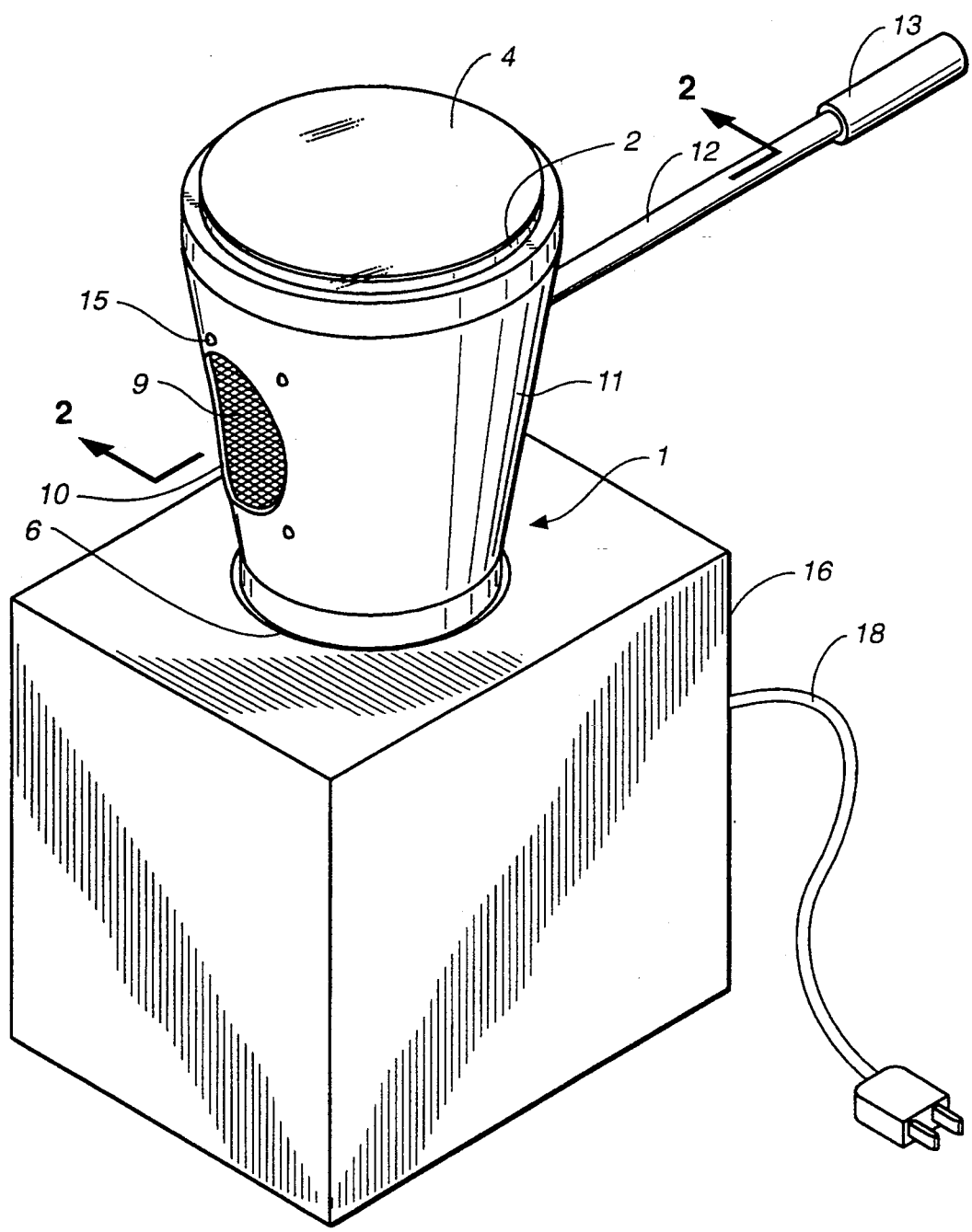
FIG._1

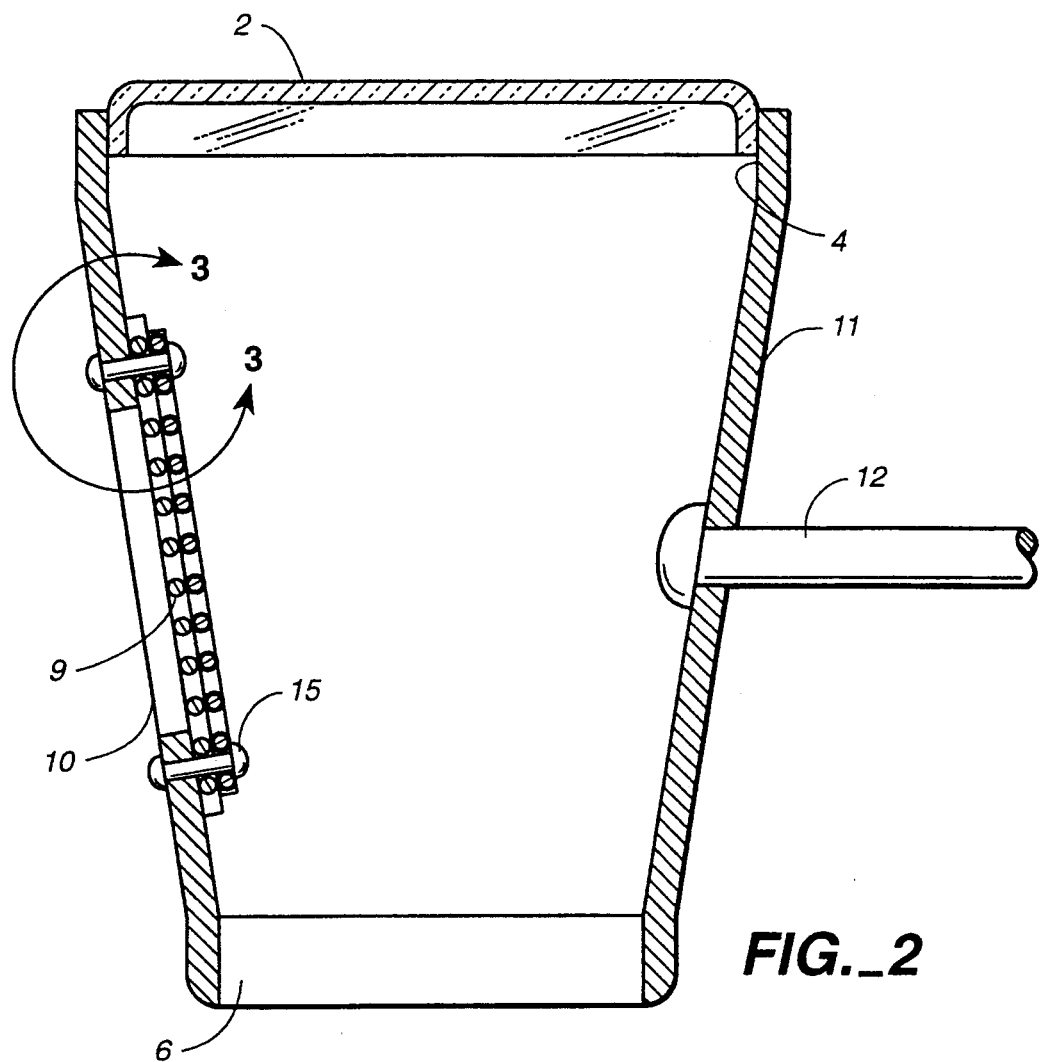
FIG._2
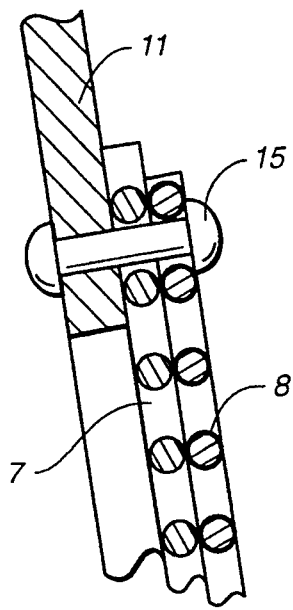
FIG._3

APPARATUS FOR SEPARATING CHAFF AND ROASTING COFFEE AND COCOA BEANS

FIELD OF THE INVENTION

This invention relates generally to the field of roasting coffee and cocoa beans. Specifically, this invention relates to a device and a method for separating the chaff and removing the chaff from coffee or cocoa beans while the beans are being roasted.

BACKGROUND OF THE INVENTION

Coffee bean roasting devices currently on the market are quite elaborate and consequently are very costly to the average consumer. Examples of such roasters are disclosed and claimed in U.S. Pat. Nos. 3,964,175; 4,326,114; 4,691,447; and 4,489,506. The latter patent recognizes the problem of auto-ignition of chaff removed from the coffee bean. This patent provides a mechanical collection system for separating the chaff from the beans during the roasting process. U.S. Pat. No. 4,925,682 does disclose and claim a simple and hence an inexpensive coffee roaster that comprises a dish-shaped container that must be shaken during the roasting process. However, such prior art coffee roasters do not solve the problem of auto-ignition of the chaff.

Instead of purchasing the relatively expensive coffee roasters currently on the market, consumers have attempted to use the relatively inexpensive electrical popcorn poppers. Such poppers are disclosed and claimed in U.S. Pat. No. 4,178,843. Such attempts have been largely unsuccessful because of the chaff auto-ignition problem that resulted in flash fires during the roasting process.

There is an almost universal interest in roasting an individual consumer's coffee or cocoa beans on the way to producing a more flavorful cup of coffee or cocoa. Consequently, there is a need for a simple and inexpensive device for roasting the beans with the concomitant solution to the chaff auto-ignition problem.

SUMMARY OF THE INVENTION

The apparatus of the present invention solves the problem of separating and collecting the chaff that comes off the coffee or cocoa beans during the roasting, re-roasting or refreshing of the beans. The present apparatus is designed to be combined with air heating and hot air blowing means for roasting the beans. Such bean roasting mechanisms are used in electrical popcorn poppers finding widespread acceptance in households and small commercial establishments. The motor unit or mechanism used by the present invention consists of a base housing, a cup for the beans of coffee, cocoa, mixtures of coffee and cocoa or popcorn having hot air vents around the periphery of the bottom of the cup within the housing, an electric motor and a blower mounted within the housing. The blower moves air over red-hot electric heating coils and blows the resulting air at a temperature of about 400° to about 450° F. through the hot air vents and into the cup.

The chaff separating apparatus of the present invention comprises a hopper or collector having an open top, an open bottom and an exhaust gas outlet. The bottom fits over the top of the cup, generally metal, of the bean roasting mechanism. A lid covers the open top. A screen is mounted over the exhaust gas outlet and is specially treated to collect and remove the chaff from the exhaust gases escaping from the apparatus during the bean roasting process. The screen is coated with a mixture of material designed to hold the chaff by means of a self-generating electrostatic positive to negative charge molecular attraction. The electrostatic attraction develops on the screen as the hot exhaust gases pass over the coated surface of the screen during the bean roasting process. In other words, the screen becomes electrostatically charged during the roasting process because of the mixture of materials upon its surface. The chaff that becomes separated from the beans during the roasting process is entrained in the exhaust gases. The exhaust gases then pass upward from the bean roasting mechanism through the open bottom and are collected on the electrostatically charged screen. After the beans are roasted, the hopper is easily removed from the roasting mechanism with tongs, a hot pad or preferably by means of a handle attached to the hopper. The chaff strongly adheres to the screen until it has sufficiently cooled or until the hopper is shaken to dislodge the chaff from the screen.

BRIEF DESCRIPTION OF THE DRAWINGS

FIG. 1 is an isometric view of the apparatus of the present invention;

FIG. 2 is a cross-sectional view of the apparatus of the present invention taken along line 2—2 of FIG. 1; and FIG. 3 is a detailed, partly cross-sectional view of the apparatus of the present invention taken along line 3—3 of FIG. 2.

DETAILED DESCRIPTION OF THE PREFERRED EMBODIMENT

Preferably the screen comprises a copper-zinc alloy, e.g. brass, screen having a mesh in the range of about 5 to about 200, preferably about 10 (openings of about 1/16 inch) to about 35 (openings of about 1/64 inch). It has been found that such a screen develops a slight positive electrostatic charge during the roasting process. The light, oily chaff develops a negative charge and will have a slight tendency to stick to the screen. However, the resulting electrostatic force between the screen and the chaff is insufficient to cause a significant amount of the chaff to adhere to the screen during the roasting process. Consequently, the chaff will fall into the cup of the roasting mechanism and contact the hot beans. The chaff will become ignited and cause a flash fire within the cup.

The understanding of the electrostatic phenomenon led to the present invention. Initially the brass screen has a natural negative charge when connected to ground. During the roasting process, the brass screen develops a semiconductor copper oxide film on its surface that imparts a slight positive charge to the screen. This results in a positive and negative junction or a P & N junction, as it is commonly referred to in semiconductor engineering. To achieve a stronger P & N junction and hence a stronger electrostatic charge on the exhaust gas screen requires coating the screen with a mixture of materials. This mixture comprises a polar active dialectric compound that is stable at high temperatures, a polar dialectric compound that acts as a spacer for the polar active dialectric compound and an adhesive that causes the mixture to permanently adhere to the surface of the screen. The mixture is placed into a slurry with a suitable carrier such as an alcohol or a solvent such as acetone that will evaporate without an appreciable residue. The screen is dipped into the slurry of the mixture and the coated screen is dried. The result is a screen coated with a mixture of materials exhibiting a sufficiently strong electrostatic polarly active and insulating barrier. This barrier causes the chaff generated during roasting process to adhere to the coated surface of the screen.

The polar active dialectric compounds used to produce a strong P & N junction include titanium dioxide as well as powdered ceramics such as barium titanate and titanium aluminides. Titanium dioxide is preferred because it is low in cost, non-toxic and readily available.

The polar spacer dialectric compounds used in the mixture include silicates such as sodium silicate, calcium silicate, potassium silicate, calcium magnesium silicate, ferrous ammonium silicate, barium titanium silicate, hydrous magnesium silicate (talc), and mixtures thereof.

A suitable binder for the mixture is selected from any of the organosilicon oxide polymer resins commonly called silicone resins.

The preferred mixture comprises between about 50 to about 85 parts by weight of the polar active dialectric compound, about 10 to about 50 parts by weight of a polar spacer dialectric compound and about 1 to about 30 parts by weight of a binder. For cosmetic reasons a non-toxic pigment may be added to the mixture in the amount of about 2 to 3 parts by weight. The latter additive as well as other additives can be added without greatly affecting the ability of the screen to hold the bean chaff for a safe period.

The preferred screen assembly is a double screen comprising an outside screen having one face toward the exterior of the hopper and an inside screen having one face toward the interior of the hopper. The other face of the inside screen is flush with the other face of the outside screen. The entire surface of the inside screen is coated with the mixture of polar active dialectric compound, polar spacer dialectric compound and binder.

Referring now to FIGS. 1–3, truncated conically hopper 1 has open top 4, open bottom 6 and exhaust gas outlet 10 on sidewall 11. Lid 2 is fixedly attached to open top 4. Uncoated screen 7 and coated screen 8 are abutted to form double screen 9. Screen 9 is attached to sidewall 11 by means of screws 15 or other common fasteners to completely cover exhaust gas outlet 10. Handle 12 is fixedly attached at the midpoint of sidewall 11 between top 4 and bottom 6. Hopper 1 comprises a malleable metal such as brass, steel or the like. Lid 2 comprises a translucent or transparent material such a heat resistant plastic or glass. Alternatively, lid 2 can comprise the same metal as that of hopper 1. In that case lid 2 contains a window of a translucent or transparent of sufficient size to allow observation of the beans as they are being roasted. FIG. 1 shows open bottom 6 of hopper 1 mounted over the heating and blowing motor mechanism 16 of a conventional electrical popcorn popper. Examples of suitable popcorn poppers are manufactured by West Bend Company, Presto Company, WearEver-Proctor Silex, Inc. and Wiersilor Corporation.

EXAMPLE

Copper-based (brass-like) truncated conical hopper 1 was placed in a jig. Hopper 1 with a length of 5 inches and a thickness of $\frac{1}{8}$ inch had open top 4 with a diameter of 4 inches, open bottom 6 with a diameter of 2 11/16 inches, exhaust gas outlet 10 with a diameter of 2 inches and sidewall 11 with a thickness of $\frac{1}{8}$ inch. The center of outlet 10 was located on sidewall 11 half way between top 4 and bottom 6. Translucent heat resistant glass (Pyrex®) petri dish with an outside diameter of $3\chi$ inches, a thickness of $\frac{1}{8}$ inch and sidewall 14 with a thickness of $\frac{1}{2}$ inch was inverted and fixedly attached within open top 4 by means of a heat resistant adhesive to form lid 2. Lid 2 can comprise a thermally resistant translucent hydrocarbon plastic material. Slightly tapered copper-based handle 12 with a mean cross-sectional diameter of $\frac{1}{4}$ inch and a total length of 6 inches was welded at one end to hopper 1. Alternatively, handle 12 can be screwed into sidewall 11. Wooden grip 13 with a diameter of 1 inch and a length of 4 inches was attached to the other end of handle 12. Grip 13 can be made of any material that has a lower heat conductivity than that of handle 12, such as hydrocarbon plastics or rubber. Handle 12 was positioned 180° from the center of exhaust gas outlet 10. It can be positioned within a range of about 90° to 270° from the center of outlet 10. A copper based alloy (brass-like metal) 20–25 mesh U.S. Tyler standard screen approximately $2\frac{3}{4}$ inches on each side was first oxidized so that the surface contained a layer of copper oxide. The oxidized screen was then dipped into a slurry comprising approximately 90 parts by weight of titanium dioxide, 10 parts by weight calcium magnesium silicate and 6 parts by weight of a high temperature silicon resin in an excess of acetone as the carrier. The coated screen 8 was dried overnight and abutted against an uncoated screen 7 of the same dimensions. The resulting double screen 9 was fixedly attached to sidewall 11 by means of screws 15 to completely cover exhaust gas outlet 10 so that the coated layer of double screen 9 faced the interior of hopper 1. The taper of hopper 1 was approximately 9° from vertical and provided a degree of gravitational force to the chaff that adhered to the surface of the screen during the roasting process. The popcorn holder (not shown) was removed from base housing 16 of a commercially available popcorn popper, Poppery II™ Electric Corn Popper, Cat. No. 82000, 82001 sold by The West Bend Company, to expose an open metal cup (not shown) encased within housing 16. Cup with a length of $3\frac{1}{2}$ inches and a diameter of 2 11/16 inches had a number of hot air vents equally spaced around the periphery of its bottom to distribute the hot air evenly over the product being roasted or popped. The portion of base housing 16 below the hot air vents contained the following elements (not shown except the electrical cord 18):

(1) a voltage dropping heating coil on one electrical circuit,
(2) a major heating coil on another electrical circuit,
(3) a thermostat, which had been adjusted so that the air temperature ranged from 400°–415° C. for optimum coffee roasting, which was electrically attached across the two heating coils,
(4) AC electrical power circuit connected to each of the heating coils through electrical cord 18,
(5) a DC motor,
(6) a rectifier connected between the electrical circuit and the DC motor, and
(7) a blower attached to the DC motor and positioned to blow air over the heating coils and out through the hot air vents.

Approximately $\frac{3}{4}$ of a cup of non-prewashed green coffee beans were placed into the metal cup of base housing 16 of the popper. Hopper 1 was placed onto housing 16 and positioned so that the 2 11/16 inch rim of open bottom 6 was superimposed onto outer rim of the metal cup. Electrical cord 18 was plugged into an AC outlet to begin the coffee bean roasting process. A beam of a flash light was directed through the translucent lid 2. The coffee beans were observed to turn from green to black, to expand and to crack twice during the roasting period of just a little over 5 minutes. Brown chaff was observed to fly off the coffee beans during the roasting process, to be carried upward with the exhaust gases and to substantially completely cover the coated face of double screen 9 facing the interior of hopper 1.

Handle 12 was held by means of wooden grip 13 and hopper 1 was removed from housing 16 after the approximately 5 minute roasting period and lightly tapped against a plate. This caused the chaff that had been tightly held to the inner face of double screen 8 to become easily released. Approximately ¼ cup of very loosely packed chaff was collected. Chaff amounts collected from varied worldwide coffee bean agricultural sources will vary from this amount. Since the particular popper used in this example did not have a cold air input system, care was taken so that the coffee beans were not roasted beyond their optimum period. Therefore, the roasted beans completely free of chaff were removed from the metal cup during the first minute after the roasting period and placed in metal pans to cool. After cooling the beans to approximately room temperature, they were immediately ground and a portion of the freshly roasted and ground beans were brewed into a pot of very flavorful coffee.

What is claimed is:

1. An apparatus for separating chaff from roasted beans selected from the group consisting of coffee, cocoa and mixtures thereof which comprises a hopper having an open top, an open bottom mountable over means for roasting beans and an exhaust gas outlet located on said hopper; a lid for covering the top; and a screen mounted over the exhaust gas outlet, said screen being coated with a mixture of materials that causes the surface of the screen to become electrostatically charged during the bean roasting process, whereby the chaff that becomes separated from the beans during the roasting process is entrained in the exhaust gases which pass upward from said means for roasting beans and through the open bottom and is collected on the electrostatically charged screen.

2. The apparatus of claim 1 wherein a handle attached to a sidewall of said hopper.

3. The apparatus of claim 2 wherein the mixture comprises a polar active dialectric compound, a polar spacer dialectric compound and a binder.

4. The apparatus of claim 3 wherein the polar active dialectic compound is selected from the group consisting of titanium dioxide, barium titanate, titanium aluminide, and mixtures thereof.

5. The apparatus of claim 3 wherein the polar spacer dialectric compound is selected from the group consisting of sodium silicate, calcium silicate, potassium silicate, calcium magnesium silicate, ferrous ammonium silicate, barium titanium silicate, hydrous magnesium silicate, and mixtures thereof.

6. The apparatus of claim 3 wherein the binder is a silicone resin.

7. The apparatus of claim 3 wherein the screen comprises brass and the mixture comprises between about 50 to about 90 parts by weight polar active dialectric compound oxide, about 50 to about 10 parts by weight of polar spacer dialectric compound and about 1 to about 10 parts by weight of a binder.

8. The apparatus of claim 7 wherein the polar active dialectric compound is titanium dioxide.

9. The apparatus of claim 7 wherein the polar spacer dialectric compound is calcium magnesium silicate.

10. The apparatus of claim 2 wherein said hopper consists of a truncated conically shaped sidewall with the open bottom having a smaller cross-sectional diameter than that of the top.

11. The apparatus of claim 10 wherein a handle is attached to the sidewall between the top and the open bottom approximately at the center of gravity of said hopper.

12. The apparatus of claim 11 wherein said handle is attached to the sidewall between about 90° and about 270° from the center of said exhaust gas outlet.

13. The apparatus of claim 2 wherein said lid contains an observation window for monitoring the color of the beans during the roasting process.

14. The apparatus of claim 13 wherein the lid comprises a heat resistant material selected from the group consisting of translucent glass, transparent glass, translucent plastic and transparent plastic.

15. The apparatus of claim 2 wherein said screen is a double screen comprising an outside screen having one face toward the exterior of said hopper, an inside screen having one face toward the interior of said hopper and its other face flush with the other face of the outside screen, and wherein the inside screen is coated with the mixture of materials.

16. The apparatus of claim 1 wherein said screen comprises brass.

17. An apparatus for separating chaff from roasted beans selected from the group consisting of coffee, cocoa and mixtures thereof which comprises a hopper having a truncated conically shaped sidewall, an open top, an open bottom having a smaller cross-sectional diameter than that of the top and mountable over means for roasting beans and an exhaust gas outlet located on said hopper; a handle attached to the sidewall between the top and bottom approximately at the center of gravity of said hopper; a lid mounted over the opening in the top of said hopper and having an observational window therein for monitoring the color of the beans during the roasting process; and a screen mounted over the exhaust gas outlet, said screen being coated with a mixture of materials that causes the surface of the screen to become electrostatically charged during the bean roasting process, whereby the chaff that becomes separated from the beans during the roasting process is entrained in the exhaust gases which pass upward from said means for roasting beans and through said open bottom and is collected on the electrostatically charged screen.

18. The apparatus of claim 17 wherein said screen comprises brass.

19. The apparatus of claim 17 wherein the mixture comprises a polar active dialectric compound, a polar spacer dialectric compound and a binder.

20. The apparatus of claim 19 wherein the polar active dialectric compound is selected from the group consisting of titanium dioxide, barium titanate, titanium aluminide, and mixtures thereof.

21. The apparatus of claim 19 wherein the polar spacer dialectric compound is selected from the group consisting of sodium silicate, calcium silicate, potassium silicate, calcium magnesium silicate, ferrous ammonium silicate, barium titanium silicate, hydrous magnesium silicate, and mixtures thereof.

22. The apparatus of claim 19 wherein the binder is a silicone resin.

23. The apparatus of claim 19 wherein the screen comprises brass and the mixture comprises between about 50 to about 90 parts by weight polar active dialectic compound oxide, about 50 to about 10 parts by weight of polar spacer dialectric compound and about 1 to about 10 parts by weight of a binder.

24. The apparatus of claim 23 wherein the polar active dialectric compound is titanium dioxide.

25. The apparatus of claim 23 wherein the polar spacer dialectric compound is calcium magnesium silicate.

26. The apparatus of claim 23 wherein the binder is a silicone resin.

27. An apparatus for roasting beans which comprises means for roasting beans, a hopper having an open top, an open bottom mountable over said means for roasting beans and an exhaust gas outlet located on said hopper; a handle attached to said hopper; a lid for covering the top; and a screen mounted over the exhaust gas outlet, said screen being coated with a material that causes the surface of the screen to become electrostatically charged during the bean roasting process, whereby the chaff that becomes separated from the beans during the roasting process is entrained in the exhaust gases which pass upward from said means for roasting beans and through the open bottom and is collected on the electrostatically charged screen.

* * * * *